(12) United States Patent
Coffin, III et al.

(10) Patent No.: US 7,149,230 B2
(45) Date of Patent: Dec. 12, 2006

(54) TRANSPORT PROCESSOR FOR PROCESSING MULTIPLE TRANSPORT STREAMS

(75) Inventors: Louis F. Coffin, III, Mountain View, CA (US); Deepak Prakash, Fremont, CA (US); James A. Lundblad, Mountain View, CA (US); Victor A. Tirva, Mountain View, CA (US); Geroncio G. Galicia, Santa Clara, CA (US); Paul B. Brown, San Ramon, CA (US); James A. Baldwin, Emerald Hills, CA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 10/094,048

(22) Filed: Mar. 8, 2002

(65) Prior Publication Data

US 2003/0169783 A1    Sep. 11, 2003

(51) Int. Cl.
    *H04J 3/04* (2006.01)
(52) U.S. Cl. .................................. 370/536
(58) Field of Classification Search ............... None
    See application file for complete search history.

(56) References Cited

U.S. PATENT DOCUMENTS

| | | | |
|---|---|---|---|
| 6,434,170 B1* | 8/2002 | Movshovich et al. | 370/536 |
| 6,538,656 B1* | 3/2003 | Cheung et al. | 370/471 |
| 6,807,191 B1* | 10/2004 | Fujii et al. | 370/464 |
| 2002/0136406 A1* | 9/2002 | Fitzhardinge et al. | 380/210 |
| 2003/0142752 A1* | 7/2003 | Demas et al. | 375/240.27 |
| 2006/0010267 A1* | 1/2006 | Abullarade et al. | 710/62 |

OTHER PUBLICATIONS

Hanna, C. et al.; Demultiplexer IC for MPEG2 Transport Streams; *Consumer Electronics;* vol. 41, No. 3; Aug. 1995; pp. 699-706.
Panter, John V.; Interactive Digital Television A Systems Review; *Systems Journal;* vol. 14, Iss. 1; Autumn 1999; pp. 1-20.
Stammnitz, P. and Gruneberg, K.; Hardware Implementation of the Transport Stream Demultiplexer for the HDTVT Demonstrator; *Signal Processing of HDTV;* VI; 1995, pp. 435-441.

* cited by examiner

*Primary Examiner*—Chi Pham
*Assistant Examiner*—Anh-Vu Ly
(74) *Attorney, Agent, or Firm*—Workman Nydegger

(57) ABSTRACT

A processing apparatus for processing multiple video programs from one or more transport streams. The processing apparatus has a transport processing circuit that includes multiple transport processor units. The transport processor units utilize a common transport processor memory unit having demux context entries containing processing and hardware state information for packet types. Each transport processor unit includes a transport interface for identifying data packets to be acquired from the transport stream, a demultiplexing processor for processing the acquired data packets, and a demultiplexing DMA unit for memory handling operations of the processed data packets. Index chaining allows the transport processor units to access information from the transport processor memory unit. The method uses indices to access demux context entries from the transport processor memory unit. Related DMA indices are used to access memory handling information from the transport processor memory unit.

34 Claims, 12 Drawing Sheets

TRANSPORT PROCESSOR FOR PROCESSING MULTIPLE TRANSPORT STREAMS

BACKGROUND OF THE INVENTION

1. The Field of the Invention

The present invention relates to methods and apparatus for processing incoming video streams, and more particularly, to methods and apparatus for performing a plurality of demultiplex processing operations on one or more incoming video transport streams.

2. Background and Related Art

Advances in the field of digital video and digital video formats have increased the popularity of using digital video to transport video programming to users. Digital video data is transmitted to viewers using transport streams, which contain the encoded digital video data and the information used by transport stream processors to decode the video data so that it can be displayed to the viewers.

A transport stream includes a series of packets representing digital video data. The exact configurations of the data packets are defined by the digital video format used to encode the video programming. Two of the most common formats are digital video broadcast (DVB), which is based on the Moving Pictures Expert Group-2 (MPEG-2) standard, and digital satellite system (DSS) developed by DIRECTV. DVB has 188-byte packets while DSS has 130-byte packets. The packets of the transport stream include a payload in which the digital video data is encoded and a header that includes an identifier so that the transport stream processor can select packets that correspond to a desired program. In DVB, the identifier is called a packet identifier (PID), while in DSS, the identifier is called a service channel identifier (SCID). Each PID/SCID operates to identify packets of the given type.

There can be approximately 20 to 40 different PIDS/SCIDS within a transport stream, which typically includes multiple programs, each being represented by one or more PIDS/SCIDS. For example, a program may have one PID representing all audio packets, a different PID representing all video packets, and another PID representing packets containing processing information. Transport processing includes demultiplexing the packets so as to obtain the packets associated with a desired program and assembling the packets in such a way that a video decompressor can configure the data into a digital video program.

FIG. 1 illustrates a conventional transport stream processor 1. The transport stream processor includes a processor 10, a memory 12, an input/output (I/O) chip block 16, a descrambler 18, a PID filter 20, a direct memory access (DMA) engine 22, and a list 24. Also provided is host communication 14 through which data, including transports stream data, are provided to the transport stream processor.

Packets in the transport stream are received by processor 10 through host communication 14. Packets are then sent to I/O chip block 16, through which the packets are delivered to descrambler 18. Descrambler 18 performs descrambling operations on the incoming transport stream, including application of PID filter 20. PID filter 20 identifies packets having desired packet identifier information. Descrambler 18 then descrambles the information contained in the identified packets.

Once the packets have been descrambled, they are sent back to processor 10 through the I/O chip block 16. Processor 10 performs additional demultiplexing operations and other operations to prepare data for display as video programming. Memory 12 typically comprises a random access memory or a read-only memory. One function of memory 12 is to provide a code space for instructions defining the demultiplexing processing operations to be performed by processor 10.

Once the incoming packets have been filtered, descrambled, and processed, they are transported to DMA engine 22 through the I/O chip block 16. Because packets in the transport stream are not necessarily sequentially ordered, DMA engine 22 transmits packets into list 24. List 24 allows the packets to be sequenced appropriately for video decoding and image rendering operations performed in preparation for displaying the video data to the viewer.

One of the limitations of the conventional transport stream processor of FIG. 1 is that only a single transport stream may be processed at any given time. Additionally, only a single video program maybe decoded from the transport stream at any given time. To overcome these limitations, user systems may be include multiple transport processors for decoding multiple programs from a transport stream or from multiple transport streams.

FIG. 2 illustrates an architecture for processing multiple video programs. Specifically, FIG. 2 illustrates four separate transport stream processors 1a–d. Each transport stream processor 1a–d performs a unique demultiplexing operation on an incoming video transport stream. Moreover, each transport processor 1a–d is an independent system that includes all hardware necessary for processing a transport stream. While the illustrated architecture allows the system to simultaneously process multiple programs from one or more transport streams, the redundancy of architecture makes the apparatus both expensive to manufacture and inefficient in operation.

In view of the above, it is apparent that there is a need for new and improved methods and apparatus for processing a plurality of video programs from one or more transport streams. It is desirable that the method reduce redundancy of architecture and provide streamlined processing and retrieval of digital video packets from the one or more transport streams.

BRIEF SUMMARY OF THE INVENTION

The present invention is directed to methods and apparatus for processing multiple transport streams by utilizing a novel processing apparatus. The processing apparatus has a transport memory unit and a transport processing circuit. The transport processing circuit includes multiple transport processor units. The processing apparatus streamlines processing and reduces the redundancy of transport processing components that have been used in conventional systems. The multiple transport processing circuits of the processing apparatus can be implemented on a single integrated circuit if desired.

The transport processor memory unit is utilized by all of the transport processor units of the transport processing circuit. The transport processor memory unit contains processing information and also maintains the hardware state of each packet identifier that the transport processor units are assigned to acquire and process. By utilizing a common transport processor memory unit, a separate memory for each transport processor unit is no longer needed. This allows for fewer system components, streamlined operation and design, and reduced cost compared with prior art systems for processing multiple transport streams, in which each transport stream processor has its own memory.

According to the invention, each transport processor unit includes a transport interface, a demultiplexing processor, and a demultiplexing DMA. The transport interface identifies packets to be acquired from the video transport stream. The demultiplexing processor performs demultiplexing processing operations on the acquired data packets. The demultiplexing DMA performs memory handling operations related to the processed data packets.

The present invention also utilizes a method of index chaining, in which indices are used to access the processing information and the hardware state of previously processed packet identifiers from the common transport processor memory unit. A unique index is provided for every packet identifier that the transport processor units acquire and process. In one embodiment, a packet identifier index representing the packet type is provided by the transport interface. The packet identifier index is used by the demultiplexing processor to access a demultiplexing context entry from the shared context storage of the transport processor memory unit. The demultiplexing context entry contains control fields for informing the demultiplexing processor operations. The demultiplexing processor provides a DMA index for the data packet. The demultiplexing DMA uses the DMA index to access memory handling information from the shared context storage of the transport processor memory unit.

One embodiment of the present invention utilizes a transport stream switch for arbitrating multiple transport streams into the transport processing circuit. The transport processing circuit can process one video program for each transport processor unit. By utilizing a transport stream switch, video transport streams from more than one source can be fed to the system. In one embodiment, six transport stream inputs are provided. Four inputs from tuner/demodulator pairs, one from an internal system source, and one from a playback DMA. In the embodiment, the transport stream switch selects which of the six transport streams will be processed and by what transport processor unit.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

As discussed above, the present invention is directed to methods and apparatus for processing multiple video programs for one or more video transport streams. A set-top box or other video processing device that includes multiple transport processor units according to the invention can simultaneously decode and process multiple programs or other data included in a transport stream. For example, a set-top box having four transport processor units according to the invention can perform as many as four simultaneous operations on video data. For instance, these four simultaneous operations could include decoding two programs for a picture-in-picture display, decoding a third program for recording at the set-top box, and decoding broadcast data (electronic program guides, software encoded in a transport stream, etc.). Of course, these represent only specific examples of the wide variety of applications and functionality that is enabled by the invention. Moreover, because the multiple transport processor units can be included in a single integrated circuit and can share other hardware, the invention enables such functionality to be less expensive and available in more operating environments than would otherwise be possible.

Figure 3:
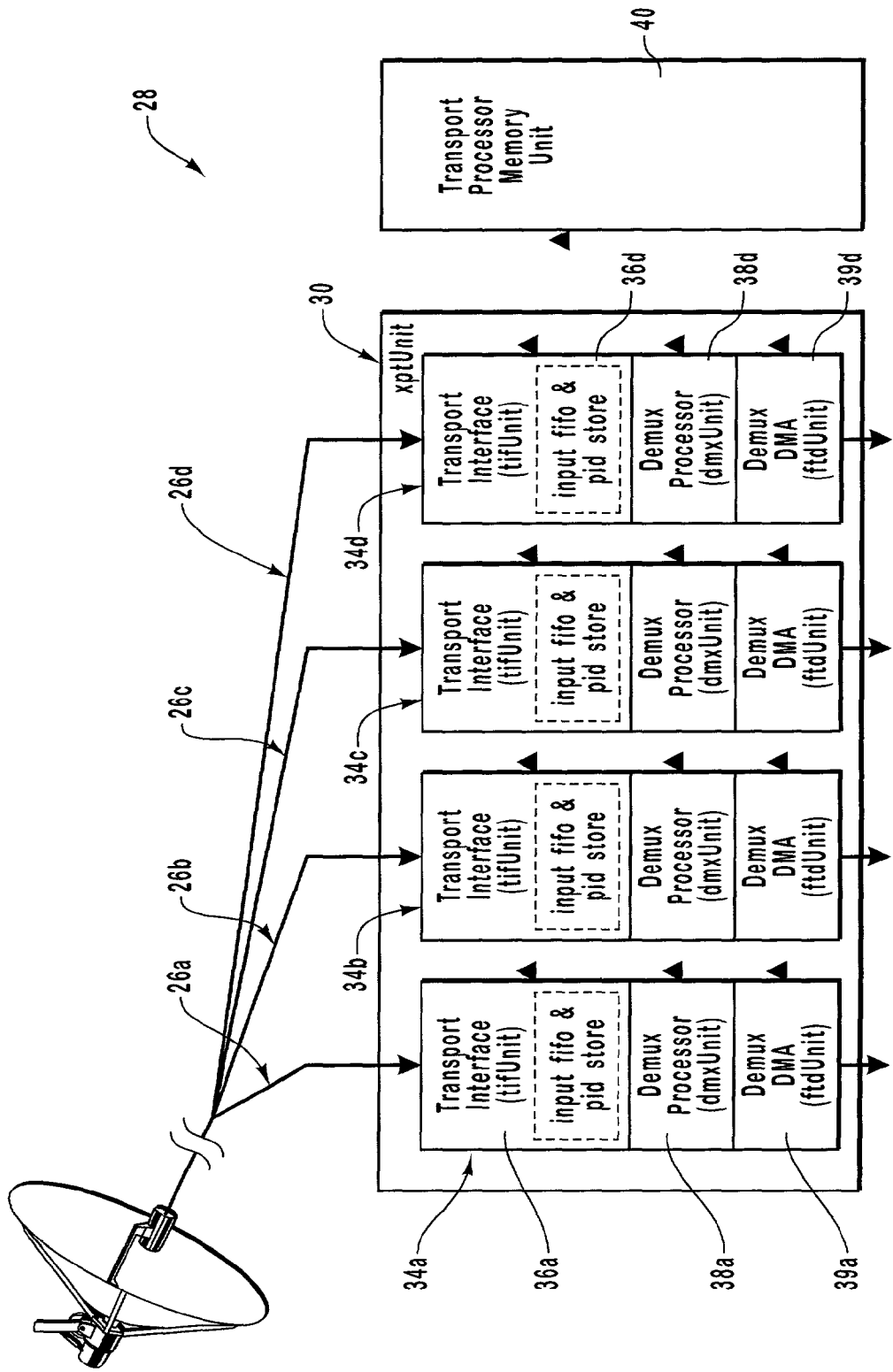
FIG. 3 illustrates a transport processing circuit of the present invention for receiving and processing one or more video transport streams utilizing a common transport processor memory unit.

With reference now to FIG. 3, there is shown a transport processor memory unit 40 and transport processing circuit 30 of processing apparatus 28. The transport processing memory unit 40 functions as the memory for the transport processing circuit 30. The transport processing circuit 30 processes multiple video programs from one or more processing streams.

Transport processing circuit 30 comprises a plurality of transport processor units. In the illustrated embodiment, transport processing circuit 30 includes a first transport processor unit 34a, a second transport processor unit 34b, a third transport processor unit 34c, and a fourth transport processor unit 34d. Each transport processor unit 34a–d is configured to receive an incoming video transport stream. In the illustrated embodiment, the first transport processor unit 34a is configured to receive first transport stream 26a. Second transport processor 34b is configured to receive second transport stream 26b. The third transport processor unit 34c is configured to receive a third incoming transport stream 26c. The fourth transport processor unit 34d is configured to receive fourth transport stream 26d. Transport processor units 34a–d and other processor units disclosed herein are examples of means for processing incoming transport streams.

In the illustrated embodiment, transport streams 26a–d can be multiple copies of the same incoming transport stream or, alternatively, can be distinct and unique transport streams. Where transport streams 26a–d are multiple copies of the same transport stream, each transport processor unit 34a–d performs a different demultiplexing operation on the stream, thus allowing the system to process multiple video programs from the same transport stream.

Where transport streams 26a–d are distinct and unique video transport streams, each of the transport processor units 34a–d processes a video program from the received transport stream. For example, where the system is equipped with multiple tuner/demodulator pairs, transport streams from different sources may be received by the system. These sources could include a digital broadcasting source, a digital satellite link source, or a digital/video cable source. Additionally, a digital video transport stream could be fed from an internal system source such as from a DVD optical disk read by the system. Transport streams associated with different transponders of a digital satellite system represent another situation in which the transport processor units 34a–d can process distinct transport streams.

Each of transport processor units 34a–d includes a transport interface, a demultiplexing processor, and a demultiplexing direct memory access unit (referred to herein as a "demultiplexing DMA"). For example, first transport processor unit 34a includes a first transport interface 36a, a first demultiplexing processor 38a, and a first demultiplexing DMA 39a. Transport interfaces 36a–d identify data packets to acquire from the incoming transport stream. Demultiplexing processors 38a–d perform processing operations on acquired data packets. Demultiplexing DMAs 39a–d determine where acquired data packets are to be transported. The operation of these components as data packets are acquired and processed will be described in greater detail below.

Figure 1:
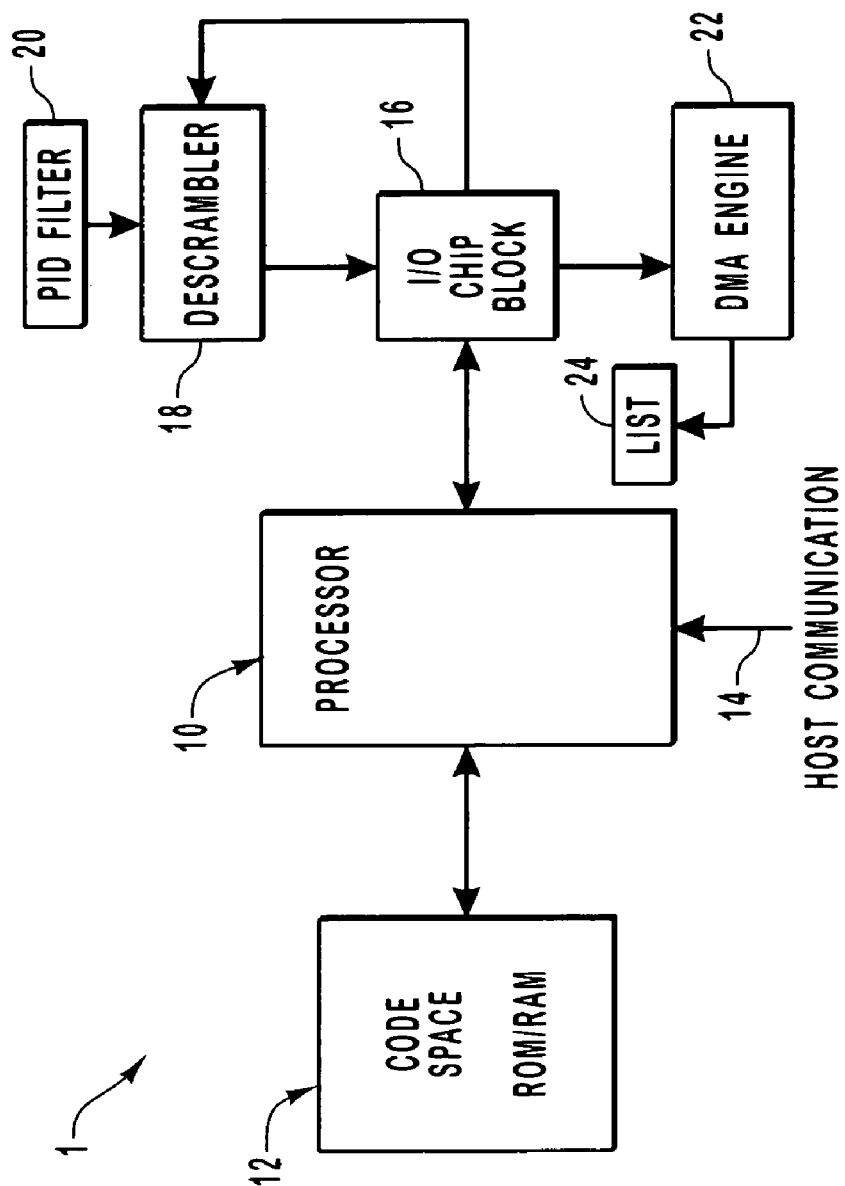
FIG. 1 is a diagram of a known transport stream processor.
Figure 2:
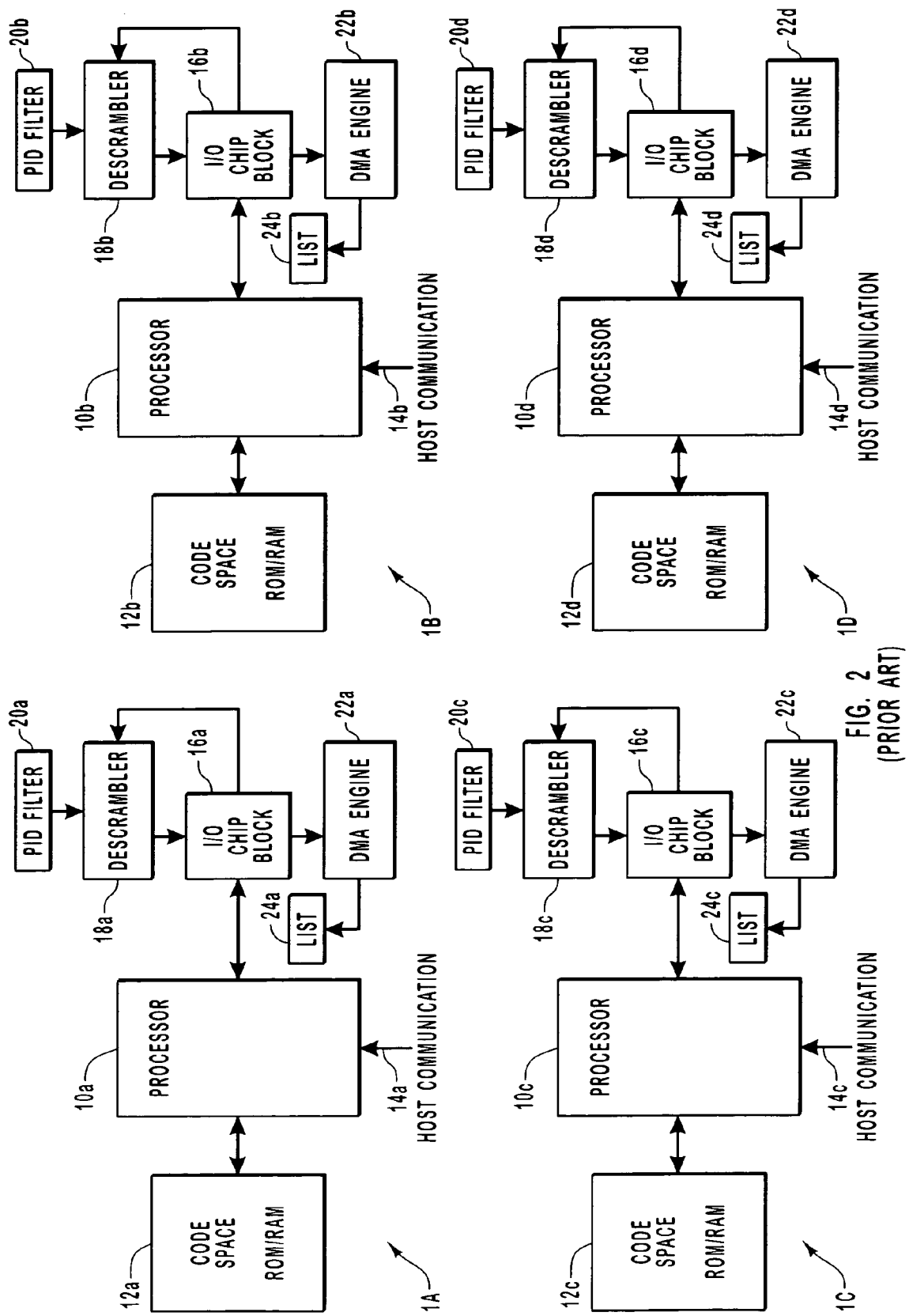
FIG. 2 illustrates a known apparatus for processing a plurality of video programs from one or more transport streams.

The transport processor units 34a–d utilize the common transport processor memory unit 40. By utilizing a common transport processor memory unit 40, the transport processor units 34a–d are able to streamline processing of incoming transport streams. Moreover, transport processor units 34a–d can be assembled on a single chip or integrated circuit, thereby reducing the physical footprint and expense that would be otherwise associated with multiple transport processors in a single system. Utilizing a common transport processor unit 40 also eliminates redundancy in the architecture of the processing apparatus 28, as was described with reference to FIG. 2. Transport processor memory unit 40 and other transport memory units disclosed herein are examples of means for storing information. Additional detail regarding the method by which individual transport processor units 34a–d utilize the common transport processor memory unit 40 will be provided below.

Figure 4:
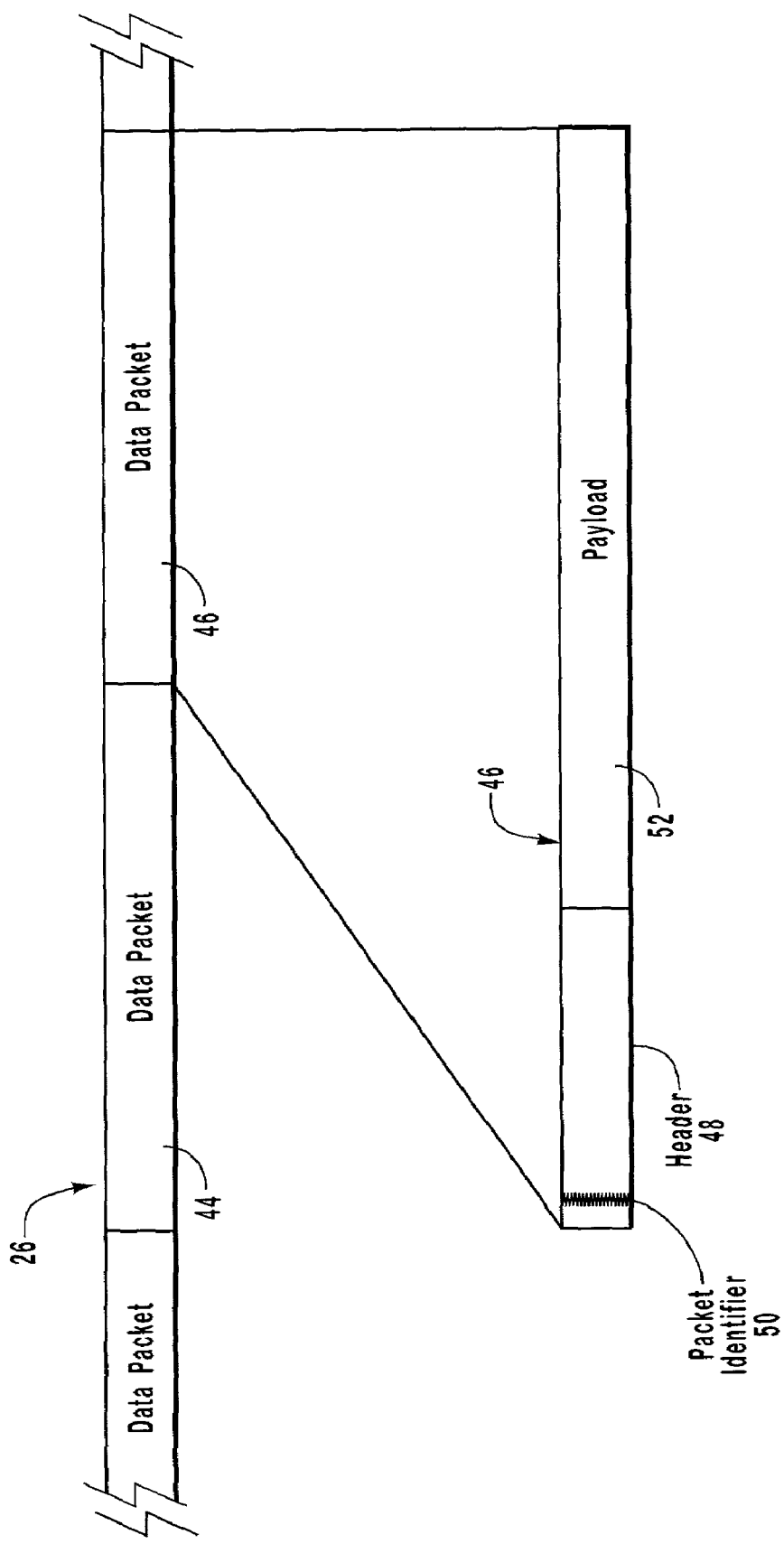
FIG. 4 is a representation of a digital video transport stream illustrating a data packet having a header, a packet identifier, and a payload.

With reference now to FIG. 4, there is shown an incoming transport stream 26. Incoming transport stream 26 includes individual data packets represented by first data packet 44 and second data packet 46. It will be understood by those skilled in the art that first and second data packets 44, 46 are illustrative of any number of data packets included in a transport stream.

FIG. 4 illustrates additional detail with respect to data packet 46. Data packet 46 is representative of some or all of the data packets in the incoming transport stream. Data packet 46 comprises a header 48 and a payload 52. Header 48 contains, among other information, a packet identifier 50, such as a PID or a SCID. As discussed above, there can be approximately 20 to 40 packet identifiers within a transport stream. A stream can carry multiple programs, each being represented by a different set of packets having one or more packet identifiers. Each packet identifier operates to identify packets of a given type associated with a particular program. For example, all audio packets of a given program can be given a unique packet identifier. Packets having a particular packet identifier are interleaved in the transport stream with packets having other packet identifiers. The sequence in which the various packets are included in the transport stream varies and depends on a number of factors, including the number of programs associated with the transport stream and the allocation of bandwidth of the transport stream among the multiple programs.

The transport processor units of the present invention filter the packets in a transport stream to obtain the packets of a desired program and assemble the packets such that a decompressor can process the packets. The transport processor units of the present invention are configured to identify and process all data packets representing a particular video program. Accordingly, each incoming data packet in a transport stream is either accepted or rejected based on the packet identifier associated with the data packet. As will be appreciated by those skilled in the art, details regarding header information, payload information, and packet identifier depend largely on the digital video format in which the packets are encoded.

Figure 5:
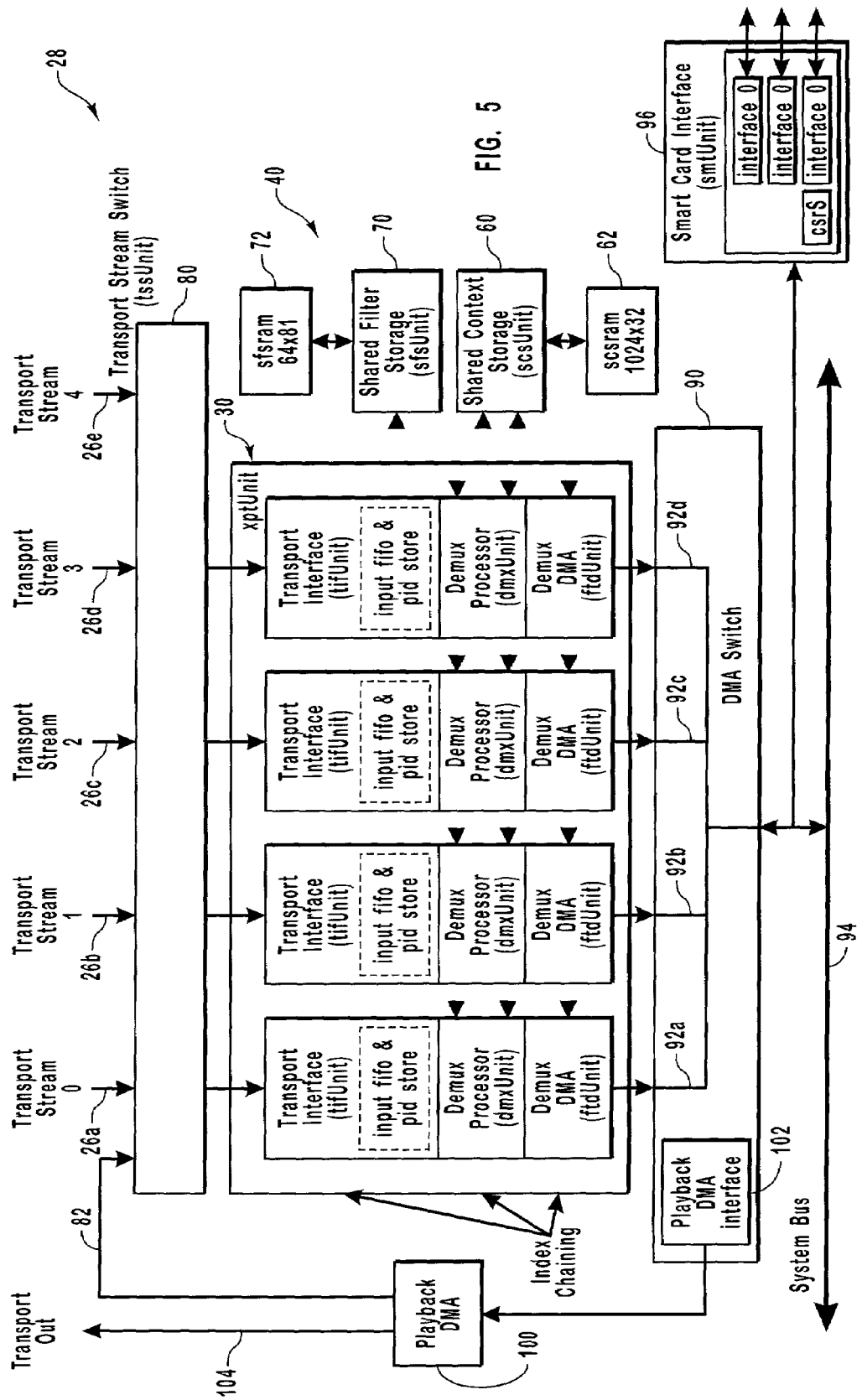
FIG. 5 is a schematic diagram of processing apparatus for receiving, processing, and transporting incoming digital video packets from one or more digital video transport streams, illustrating the transport processing circuit and the common memory in greater detail.

With reference now to FIG. 5, there is shown one embodiment of a processing apparatus that performs the operations of the invention. In the illustrated embodiment, processing apparatus 28 includes a transport processing circuit 30, a transport processing memory unit 40, a transport stream switch 80, and a DMA switch 90. In the illustrated embodiment, processing apparatus 28 is configured with six transport stream inputs. One of the incoming transport streams, namely, incoming transport stream 82, includes data provided by a playback DMA 100, which is described in greater detail below. A second incoming transport stream 26 is generated by a component or source external to the processing apparatus 28, but internal to the set-top box or other user system in which processing apparatus 28 is included. An example of a transport stream from a component or source external to the processing apparatus 28 but internal to the user system is a 1394 fire wire implementation or similar internal video feeds to the processing apparatus 28. This provides connectivity in the chip instead of feeding through the system board. The remaining four transport streams 26b–e in the illustrated embodiment represent external transport streams fed through four individual tuner/demodulator pairs.

As will be appreciated by those skilled in the art, a variety of embodiments arranged in a variety of configuration are possible without departing from the spirit or scope of the invention. For example, different numbers and arrangements of transport streams and transport stream sources can be implemented. Additionally transport streams can originate from sources other than tuner/demodulator pairs, external system sources, and playback DMA. It will be appreciated that transport streams 26b–e can represent four copies of the same transport stream or distinct and unique transport streams from alternative sources. Examples of such alternative sources could include a satellite link, a digital/video cable, broadcast media, or any other source through which a transport stream can be transmitted to the system.

In the illustrated embodiment, transport streams are passed through a transport switch 180. Because each transport processor unit can process a single video program from an incoming transport stream, the number of transport streams that may be processed simultaneously is generally limited to the number of transport processor units contained in the transport processing circuit 30. In the illustrated embodiment, the number of incoming transport streams exceeds the number of transport processor units. Thus, only four of the six incoming transport streams are processed at any time. Software determines which transport streams are passed to the various transport processor units. Transport stream switch 80 allows only the requisite number of incoming transport streams to be passed to the transport processing circuit 30.

As described above, the transport processing circuit 30 includes four transport processor units in the illustrated embodiment. As described above, each transport processor unit includes a transport interface, a demultiplexing processor, and a demultiplexing DMA. The transport interface, the demultiplexing processor, and the demultiplexing DMA all perform unique functions on the incoming transport streams. The transport interface identifies the packets that are to be obtained from the transport stream. The demultiplexing processor determines the processing that is to be performed on the acquired packets. The demultiplexing DMA determines where the data packets are to be stored.

Each of the four transport processor units performs a demultiplexing operation on an incoming transport stream. In performing demultiplexing operations, the transport processor units utilize a common transport processor memory unit 40. In the illustrated embodiment, transport processor memory unit 40 comprises shared context storage 60 and a shared filter storage 70. Shared context storage 60 is associated with a shared context storage RAM 62, while shared filter storage 70 is associated with a shared filter storage RAM 72. Transport processor memory unit 40 is one example of means for holding information.

The shared context storage 60 provides access to demultiplexing (demux) context entries. Demux context entries maintain the hardware state of each packet identifier on which the transport processor units are assigned to work. For example, while a given transport processor unit is working on an audio packet, for example, the state of the previously processed video and program packets are maintained in the demultiplexing context. The shared storage RAM 62 provides the necessary memory for maintaining shared context storage 60. The context storage functionality of the invention is described in greater detail below in reference to FIG. 8. Shared filter storage 70 contains section filters for processing acquired data packets. Shared filter storage RAM 72 provides the necessary memory for maintaining section filters.

DMA switch 90 is coupled to transport processing circuit 30. Processed data packets, which are being transported as outgoing DMA, are transported through DMA switch 90. Outgoing DMA is transported across a common PCI system bus 94. Accordingly, only a single transport processor unit may transport outgoing DMA across system bus 94 at any given time. DMA switch 90 arbitrates between individual transport processor units, ensuring that only a single transport processor unit is transporting outgoing DMA at any given time. The DMA switch 90 ensures that the data portion of each data packet has been transported in its entirety. Once the data portion has been sent in its entirety, an error status packet can be sent to the software module if an error status packet has been generated. Finally, the DMA switch 90 ensures that, if an interrupt is appropriate, the interrupt is given to the software module.

FIG. 5 further illustrates the outgoing packets from the transport processor units and the manner in which the outgoing packets are arbitrated by DMA switch 90. As shown in FIG. 5, transport processor units 34a–d transmit outgoing packet DMA 92a–d, respectively. Outgoing DMA data may be transmitted to one of at least three places: 1) to the system bus 94; 2) to a smart card interface 96; or 3) to the playback DMA 100. In one embodiment, DMA data transported via system bus 94 is sent primarily to conventional system buffers used for transport processing. In an alternative embodiment, DMA data sent via system bus 94 is sent to specifically designed ring buffers configured to accommodate packet data from processed transport streams. In yet another embodiment, DMA data sent via system bus 94 is sent to ping-pong buffers configured to accommodate data from processed transport streams.

The smart card interface 96 can retrieve encryption keys needed for additional operations to be performed outgoing DMA. Such operations, which may include conditional access to video programming as defined by the smart card, are independent from and in addition to the operations performed by the transport processing circuit 30.

Outgoing DMA data can also be transmitted to the playback DMA unit 100. Playback DMA interface 102 provides connectivity between DMA switch 90 and playback DMA unit 100 and allows outgoing DMA to be sent to playback DMA unit 100. Outgoing DMA data transmitted to playback DMA 100 may be transmitted to multiple locations from the playback DMA 100. In the illustrated embodiment, playback DMA unit 100 can transmit outgoing DMA data to transport output 104 or back to the transport stream switch 80. Transport output 104 allows outgoing DMA data to be sent to a location external to processing apparatus 28. Sending outgoing DMA data back to transport stream switch 80 allows the system to send outgoing DMA back through the transport processor unit.

Figure 6:
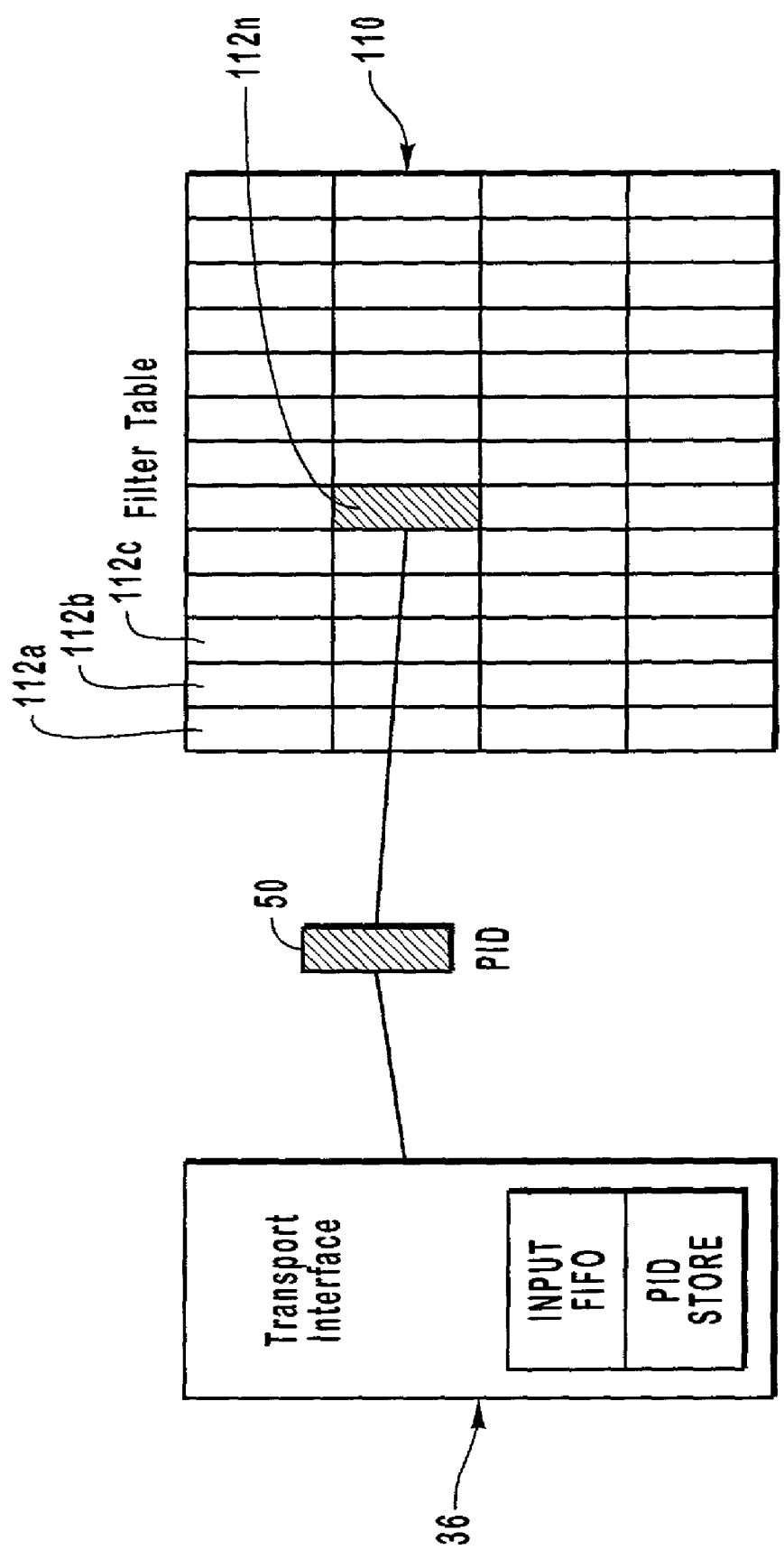
FIG. 6 illustrates a packet identifier filtering operation in accordance with the filtering operations performed by the transport interface and the index chaining method of the present invention.

With reference now to FIG. 6, there is shown a transport interface 36. Transport interface 36 is representative of transport interfaces 36a–d. Transport interface 36 receives data packets from the incoming transport stream 26. The transport interface 36 identifies data packets to acquire from the incoming transport stream 26 based on the packet identifiers associated with the desired program that is to be decoded.

The transport interface includes a single RAM, which is divided into two sections, the top being a first-in first-out buffer (fifo) and the bottom being a packet identifier filter. When a packet is received into the transport interface it is first received into the fifo. In the fifo, a time stamp is generated in the first byte of every packet. The time stamp indicates the point in time in which the packet was received. By indicating the point in time in which the packet was received, the system is capable of performing clock recovery operations on acquired data packets. Clock recovery is necessary for proper playback of many digital formats, such as DVD.

As illustrated in FIG. 6, the packet identifier for each data packet of the incoming transport stream 26 is compared to a filter table 110. Filter table 110 includes filter table entries 112a, 112b, 112c . . . 112n. Each filter table entry represents a packet identifier of a data packet to be acquired. The packet identifier for each incoming data packet is compared to the filter table entries. If a table entry matches the packet identifier, the transport interface 36 associates the packet identifier index associated with the table entry with the data packet and passes the index to the demultiplexing processor. If the packet identifier for an incoming data packet does not match a table entry, the packet is discarded.

Thus, each packet identifier index represents a given packet identifier. This allows the transport interface 36 to identify packets to be acquired. In one embodiment, the packet identifier index comprises a 7 bit code. Because packet identifiers are typically at least 13 bits, the packet identifier index allows for streamlined processing of data packets. This is particularly useful in index chaining which will be discussed in greater detail below.

Figure 7:
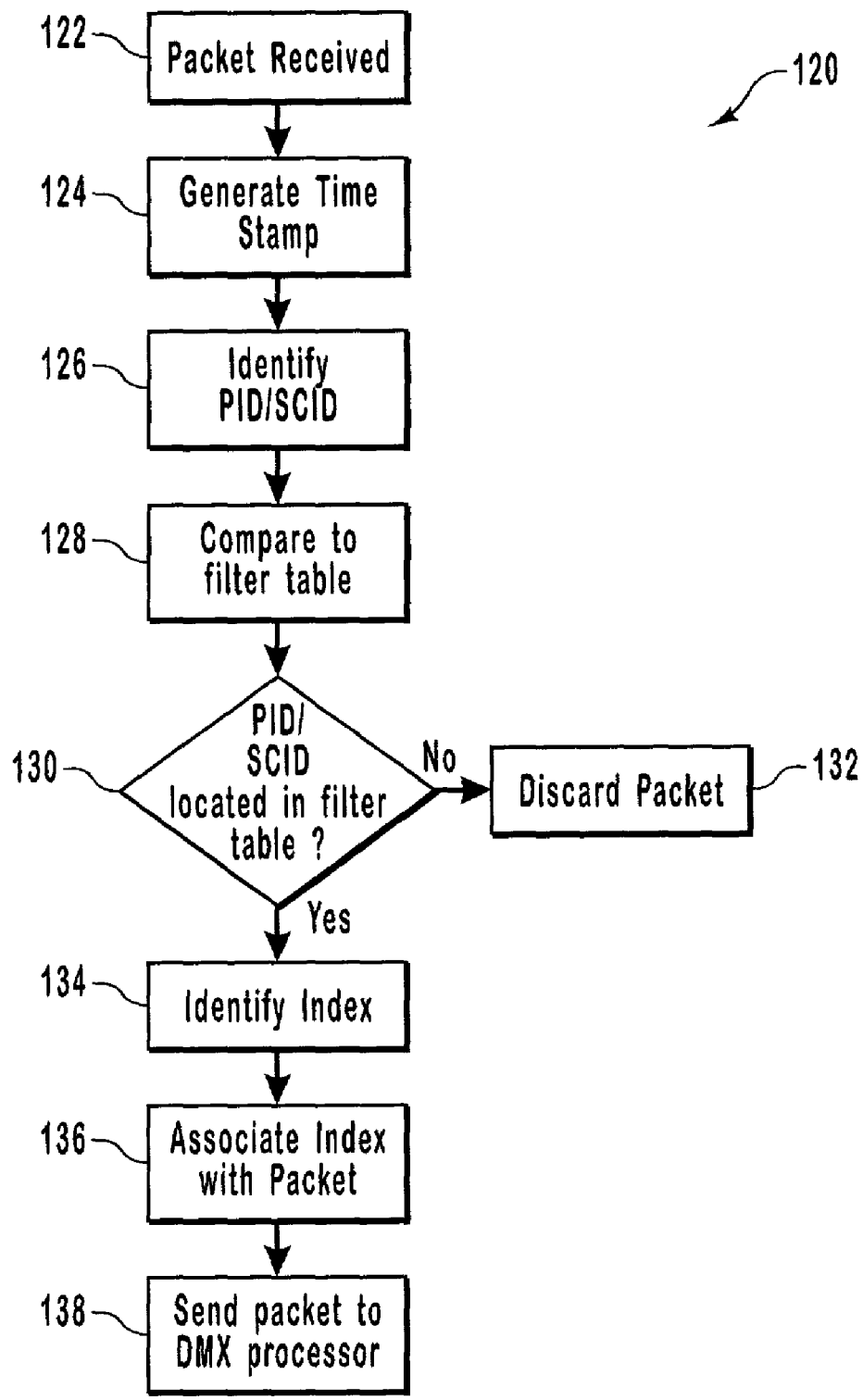
FIG. 7 is flow chart illustrating one embodiment of the logic of the filter and index chaining operations performed in the transport interface.

With reference now to FIG. 7, there is shown a flow diagram illustrating the logic functions performed by transport interface 36. In step 122, a packet is received into the transport interface. Once the packet is received into the transport interface, a time stamp is generated in step 124. The packet identifier is then identified in step 126. Once the packet identifier is identified, the packet identifier is compared with table entries of the filter table in step 128. The transport interface then determines whether the packet identifier is located in the filter table according to decision block 130. In the event that the packet identifier is not located in the filter table, the packet is discarded in step 132. If, however, the packet identifier is located in the filter table, a packet identifier index associated with the table entry is identified in step 134. Once the index is identified, the index is associated with the packet in step 136. The transport interface then sends the packet to the demultiplexing processor in step 138.

Thus, the transport interface performs two primary functions: 1) generating time stamps for clock recovery necessary for proper playback of the digital video program; and 2) identifying data packets to acquire. According to one embodiment of the invention, the packet identifier filter is either a 13 or 12-bit filter, depending on whether it is filtering PIDs or SCIDs, for identifying packet identifiers that system software has determined represent packet identifiers of packets to be processed and stored in memory. Transport interface 36 and other transport interfaces disclosed herein are examples of means for identifying data packets to acquire from an incoming transport stream.

Figure 8:
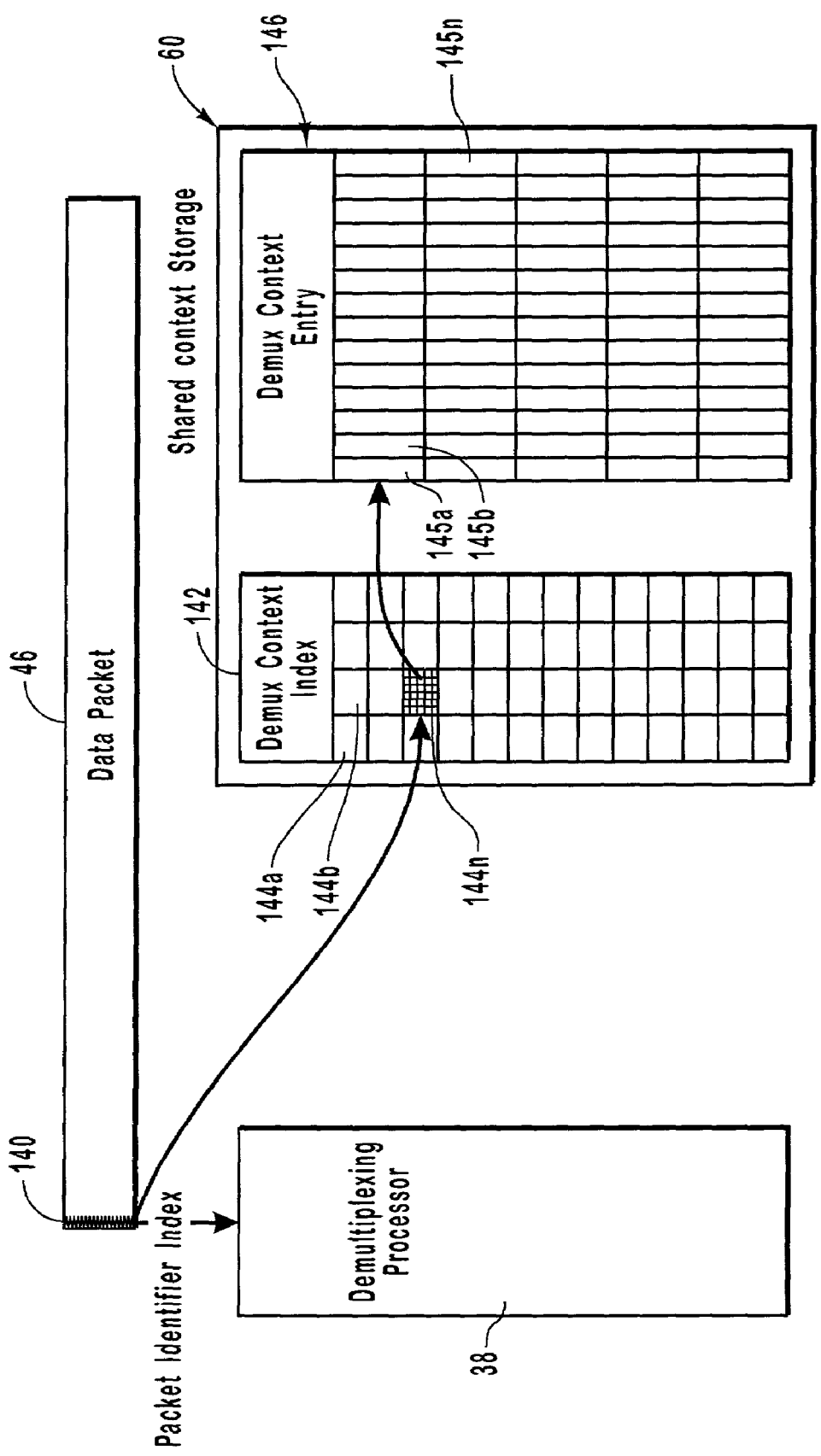
FIG. 8 illustrates the method by which the demultiplexing processor uses a packet identifier index to access a demultiplexing context entry in the shared context storage in accordance with one embodiment of the present invention.

With reference now to FIG. 8, there is shown demultiplexing processor 38 and shared context storage 60. Demultiplexing processor 38 filters packet data, controls descrambling operations, and performs other data processing. Demultiplexing processor 38 and other demultiplexing processors disclosed herein are examples of means for performing processing operations.

One of the complexities of demultiplexing processor 38 is that it is assigned to process packets from several different packet identifiers, although the demultiplexing processor can only process one packet at a time. An important component of the processing apparatus 28 that allows the demultiplexing processor 38 to process packets having several different packet identifiers is the shared context storage 60. Shared context storage 60 maintains the hardware state for each packet identifier on which the demultiplexing processor 38 is assigned to work. The hardware state for each packet identifier is maintained in a demultiplexing (demux) context entry.

The demux context entry contains both the general packet processing information and specific status information related to recently processed packets for each packet identifier on which it is assigned to work. For example, if the demultiplexing processor 38 is processing an audio packet, the processing instructions and the state of the previously processed video and program packets are maintained in the demux context entries.

The demux context allows the demultiplexing processor to determine where it left off the last time it was processing a given type of packet. In one embodiment of the invention, each demux context entry is 32 bits wide by five words deep. As will be appreciated by those skilled in the art, demux context entries may be embodied in a variety of configurations without departing from the scope or spirit of the present invention. In this embodiment, each demux context entry contains fields that instruct the demultiplexing processor regarding descrambling control, demultiplexing filter selection, storage format, DMA channel selection, and error detection.

When a packet identifier index is sent to demultiplexing processor 38, the demultiplexing processor 38 compares the packet identifier index 140 to a demux context index 142. The demux context index 142 includes demux index entries 144a, 144b . . . 144n. The packet identifier index 140 points to a demux index entry 144n. The demux index entry 144n is used to calculate the position of the corresponding demux context entry 146 in the shared context storage RAM. The hardware of the demultiplexing processor 38 reads the corresponding demux context entry 146 into a holding register. The demultiplexing processor 38 may then perform operations on the acquired data packet 46 based on information contained in the demux context entry 146.

The demux context entry 146 contains demux context control field 145a, 145b . . . 145n. The demux context control fields instruct the demultiplexing processor 38 on various processing operations including descrambling control, demultiplexing filter selection, storage format, DMA channel selection, and other relevant demultiplexing processor operations. For example, when a packet is received, descrambling control determines whether the incoming packet requires any descrambling. If descrambling is required, the appropriate descrambling key index is located and the data is sent to a descrambler before additional processing operations are performed.

Figure 9:
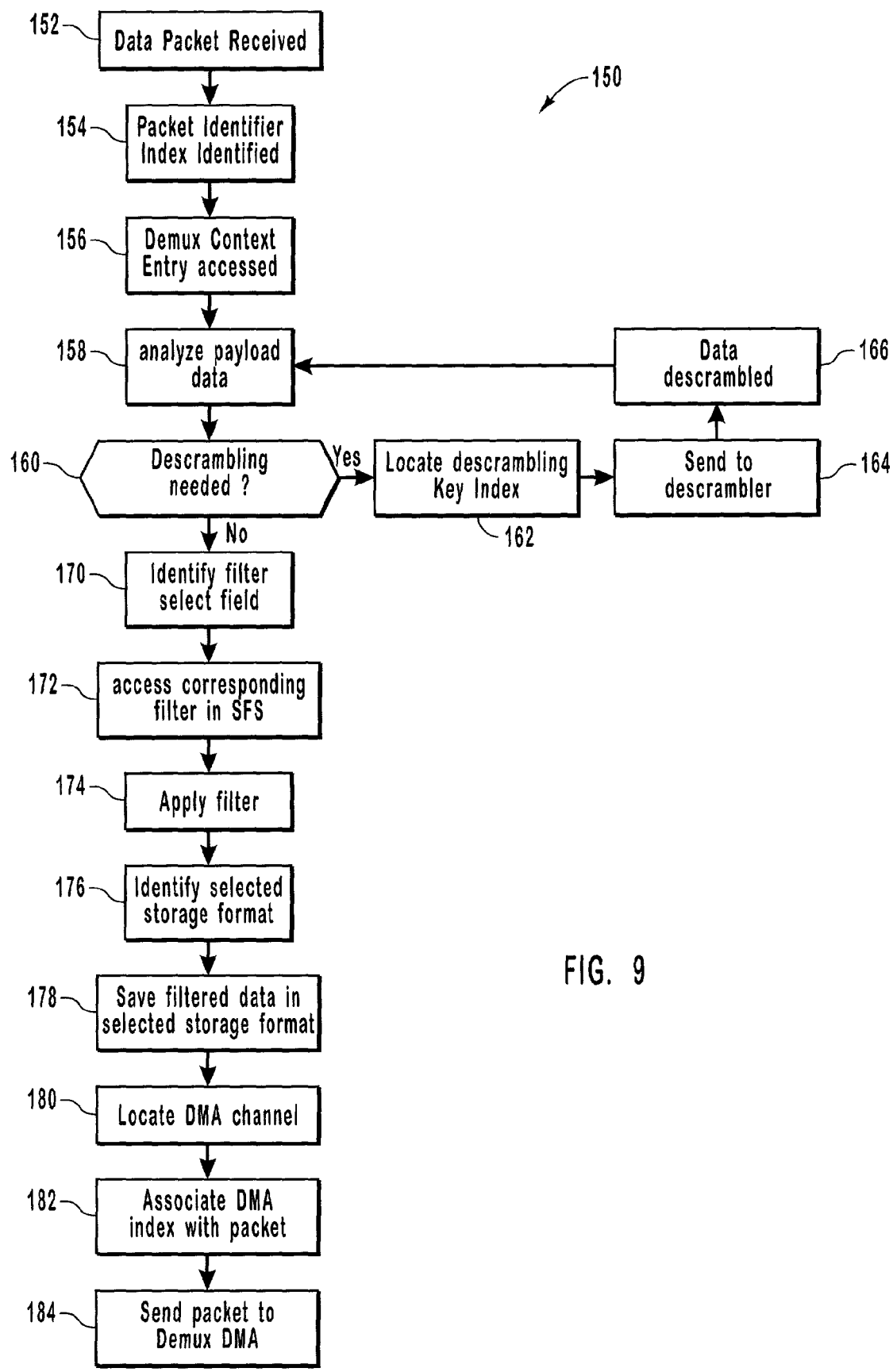
FIG. 9 is a flow chart illustrating the logic by which a demultiplexing context entry is located and utilized by the demultiplex processor in processing identified data packets in accordance with one embodiment of index chaining and demultiplex processing of the present invention.

With reference now to FIG. 9, there is shown a flow diagram illustrating the logic operations performed by the demultiplexing processor 38. In this method, the demultiplexing processor receives a data packet in step 152. The packet identifier index is then identified in step 154. Once the packet identifier index is identified, step 156 is performed, in which a demux context entry is accessed. The demultiplexing processor analyzes payload data of the packet in light of demux context control fields in step 158.

The method then proceeds to decision block 160, in which it is determined whether descrambling of the data associated with the packet is needed. In the event that descrambling is needed, a descrambling key index is located according to step 162. Once the decsrambling key index is located, the packet is sent to a descrambler in step 164 and the data is descrambled in step 166.

If, however, descrambling is not needed, the method proceeds to step 170, in which a filter select field is identified. Once a filter select field is identified, the corresponding filter in the shared filter storage is accessed in step 172. Next, in step 174, the demultiplexing processor applies the filter from the shared filter storage to the packet data. The selected storage format is identified in step 176, after which the demultiplexing processor saves the filtered data in the selected storage format in step 178. The demultiplexing processor then locates a DMA channel on which it can write according to step 180. Once the DMA channel has been located, step 182 is performed, in which a DMA index is associated with the packet. Finally, the packet is sent to the demultiplexing DMA in step 184.

As will be appreciated by those skilled in the art, method 150 and the corresponding processing operations are merely representative of operations that can be performed on data packets of a incoming transport stream. Various processing operations may be performed by the demultiplexing processor, or by other hardware of the transport processor unit, without departing from the spirit and scope of the present invention.

Figure 10:
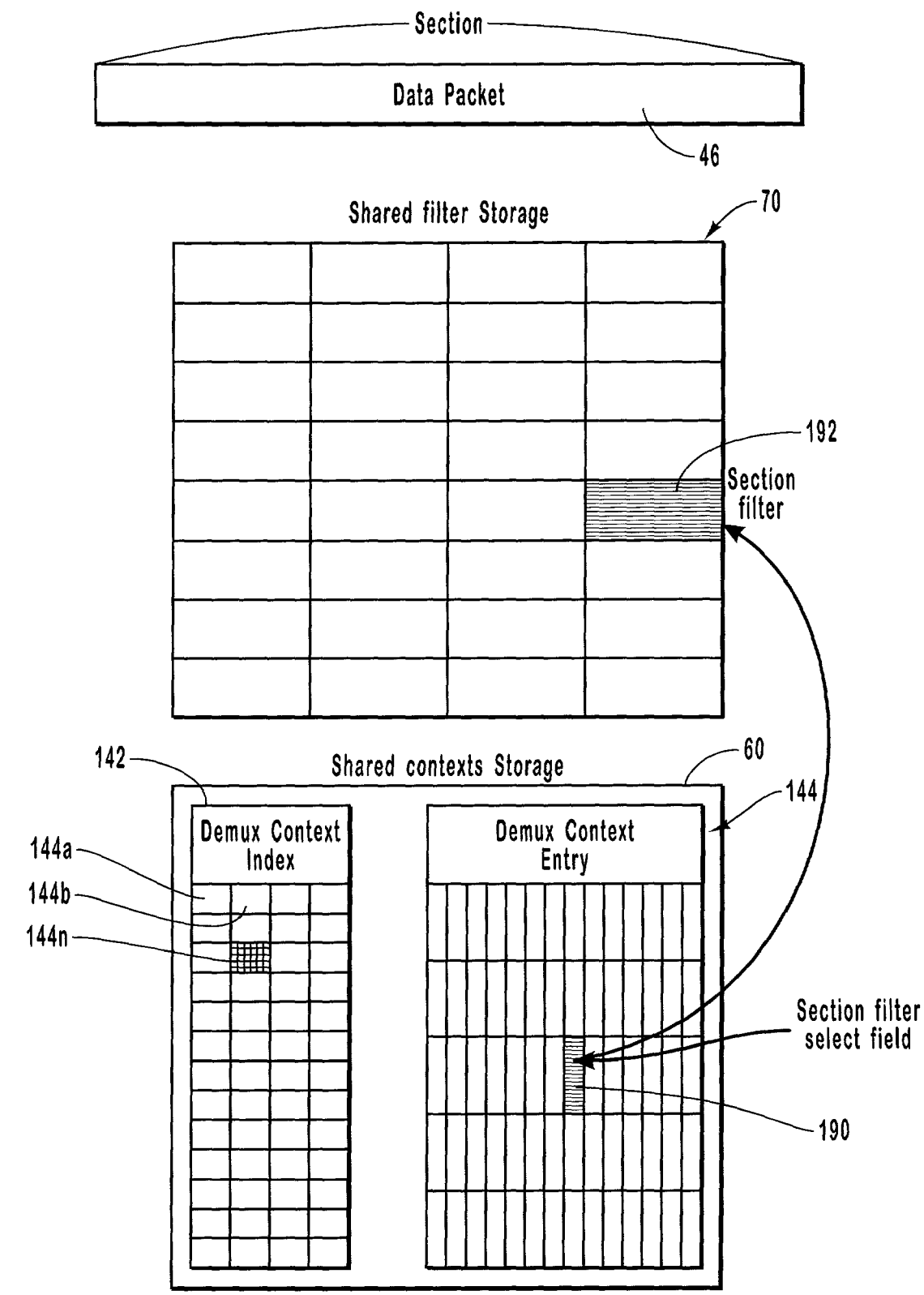
FIG. 10 illustrates a method by which a demultiplexing context entry may be used to identify a section filter in a shared filter storage for the processing of a identified data packet in accordance with an embodiment of the demultiplexing processing operations of the present invention.

With reference now to FIG. 10, there is shown the method by which a section filter from the shared filter storage may be accessed utilizing the demultiplexing context entry 144. As described with reference to FIG. 9, a packet identifier index is used to locate a demux context entry 146 by means of a demux index entry 144n. The demux context entry 146 includes demux context control fields. One of the demux context control fields comprises a section filter select field 190.

Selection filter select field 190 provides a pointer to a section filter 192 of shared filter storage 70. According to one embodiment of the invention, the section filter select field 190 is a 32-bit value that directly corresponds with one of the 32 sections filters in the shared filter storage. Each filter, including section filter 192, includes a mask that forces all bits in the data packet payload to known values. The match is then used as a bit-wide comparison against the mask value. If the bits satisfy the mask filter, the filter passes and the section is stored.

Shared filter storage 70 stores section filters for performing filter operations on data packets acquired by the demultiplexing processor. Because the shared context storage and the shared filter storage are contained in a common memory utilized by each of the transport processor units, information relating to processing is centralized. Centralizing information related to processing streamlines processing of data packets and eliminates redundant architecture present in other transport processing systems.

Figure 11:
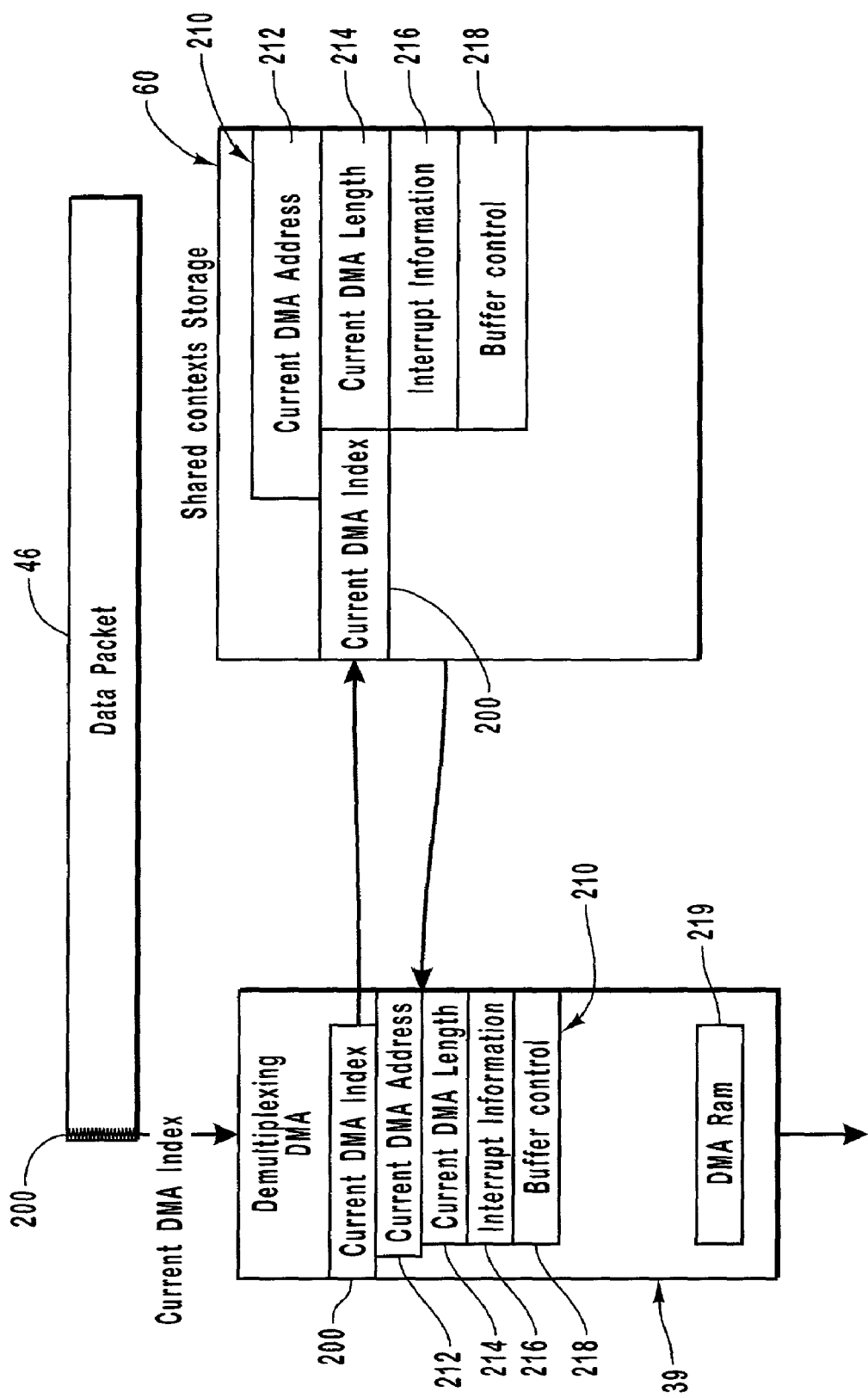
FIG. 11 illustrates index chaining operations performed in the demultiplexing DMA in which a DMA index is used to access DMA information for transferring packet data.

With reference now to FIG. 11, there is shown a method whereby the demultiplexing DMA 39 accesses DMA information from a DMA context entry 210 utilizing a DMA index 200. When a DMA index 200 is received from demultiplexing processor 38, the demultiplexing DMA utilizes the DMA index 200 to access memory handling information. The DMA index 200 points to a base register. The base register points to a DMA context entry 210 stored in the shared context storage.

DMA context entry 210 includes DMA control fields. DMA context entry control fields include DMA address information 212, DMA length information 214, interruption information 216, and buffer control information 218. DMA address information supplies the address of the DMA buffer to which the processed packet data is to be transferred. The DMA length information 214 supplies the length of the DMA buffer in which the packet information is to be transferred. Interrupt information 216 and buffer control information 218 are provided so that interrupts can be generated for packets that need service in a timely fashion.

As illustrated in FIG. 11, demultiplexing DMA 39 is configured to read information from DMA control fields 212, 214, 216, 218. Demultiplexing DMA 39 includes a DMA RAM 219, which operates to store incoming packet information. When sufficient packet information accumulates to constitute outgoing DMA, the demultiplexing DMA 39 communicates with the DMA switch 90 to transfer the packet information to the appropriate buffer. Demultiplexing DMA 39 and other demultiplexing DMAs disclosed herein are examples of means for determining where acquired data packets are to be transported.

Figure 12:
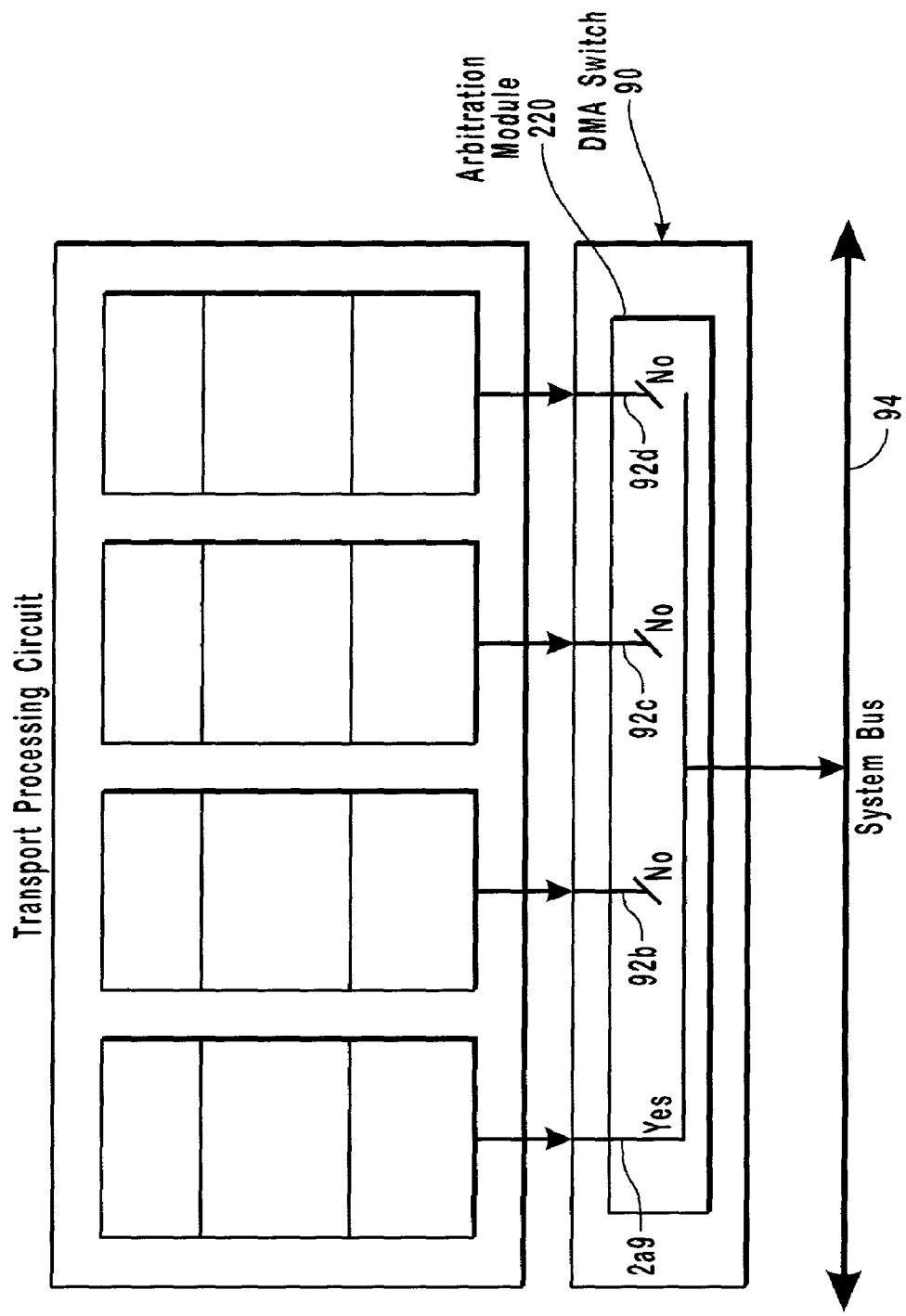
FIG. 12 is a systematic representation of the arbitration module of the present invention illustrating the method by which the transportation of DMA information is arbitrated between individual transport processor units.

With reference now to FIG. 12, there is shown the arbitration module 220 of the present invention. Arbitration module 220 is a component of the DMA switch 90. Arbitration module 220 arbitrates transfer request from the transport processor units. In the event that two or more of the demultiplexing DMAs 39a–d simultaneously communicate with DMA switch 90 in an effort to transfer packet information to DMA buffers, the arbitration module 220 arbitrates transfer requests from the transfer processors. Arbitration module 220 allocates access to the system bus 94 by determining which demultiplexing DMA will send data over the system bus 94 at any given time. DMA switch 90 acquires the system bus through the system bus interface and allows the data to be sent to system memory (i.e. DMA buffer). Thus, outgoing packet data from the first transport processor unit 92a, outgoing packet data from the second processor unit 92b, outgoing packet data from the third transport processor 92c, and outgoing packet data from the fourth transport processor unit 92d maybe sent over the system bus to the appropriate DMA buffer in an organized and coordinated fashion.

Once the packets have been completely processed, the hardware portions of the demux context and DMA contexts are updated. The contexts are then sent back to the shared context storage to be reinitialized when a packet of the corresponding packet identifier is again detected. This is accomplished by modifying the demux context entries in the holding registers with new data and writing the modified entries back to the common memory.

While the use of indices was described with reference to the functioning of the transport interface, demultiplexing processor, and the demultiplexing DMA, a more succinct explanation focusing solely on index chaining will now be explained. Index chaining facilitates the use of a common storage memory 40 by the plurality of transport processor units. The use of a common storage memory 40 simplifies processing of incoming data packets and reduces redundant architecture that would otherwise be required in the processing apparatus 28.

Index chaining utilizes an index, or series of associated indices, to access packet processing information from the common storage memory. For example, in one embodiment a packet identifier index is associated with each packet acquired by the transport interface. The index is used by the demultiplexing processor to access a demux context entry from the shared context storage. Utilizing information stored in the shared demux context entry, a demultiplexing DMA index is associated with the data packet. The DMA index is used by the demultiplexing DMA to access a DMA context entry from in the shared context storage. Thus, in this embodiment, index chaining allows demux context entries stored in the shared context storage to be accessed by each of the demultiplexing processors and each of the demultiplexing DMAs of the transport processor units. The context entries allow the demultiplexing processors to determine where they let off the last time they were working on a given type of packet. The context entries also allow the demultiplexing DMAs to identify necessary memory handling information, such as the DMA address, DMA length, and the corresponding interrupt information for data packets that are being processed.

The use of index chaining also enables the system to delay playback and/or recording of a video program received as part of an incoming video stream. In order to do so, when the incoming video stream is first received, the transport stream processor identifies all PIDs associated with the video program and acquires the packets. A time stamp is prepended to the packets. The packets of the video program are then associated with a unique index. For example, all video packets can be labeled as PID 1, while all audio packets can be labeled as PID 2. Each unique index is associated with a single DMA context which points to where the processed data packet is to be sent in system memory. Because the demultiplexing DMA operates independently of the demultiplexing processor, the transport stream processor can DMA the packets to memory without first processing the packets.

The system can then send the acquired video program back to the transport stream processor at a desired point in time for processing and playback. Since the packets have an associated index and the index points to the location of the unprocessed packets in system memory, the system can locate all the packets of the acquired video program. The time stamps prepended to the packets are used to reconstruct the program. The program can then be sent to the transport stream processor for processing and playback as if it were being received for the first time. Once the program packets are processed, the program can be played or recorded as desired by the user. Thus, the transport stream processor allows the processing and playback of a video program to be delayed without first processing the data packets associated with the video program. In one embodiment, the video program is reconstructed as a video stream before being sent to the transport stream processor for processing, playback, and/or recording.

The use of the index chaining and corresponding use of indices to access the common storage memory may be embodied in a variety of configurations without departing the scope and spirit of present invention. While in the above referenced embodiment, unique indices are provided by each of the sub-components of the transport processor units, one skilled in the art may appreciate that a single packet identifier index, even the packet identifier itself, can function as the index to access information from the common transport processor memory unit 40. In view of the description of the invention included herein, numerous additional embodiments of variations of the discussed embodiments the present invention will be apparent to one of ordinary skilled in the art. As will be understood by those skilled in the art such embodiments do not depart from the scope or spirit of the present invention.

The embodiments of the present invention may comprise a special purpose or general purpose computer including various computer hardware, as discussed in greater detail below. Set top boxes that enhance the capabilities of conventional televisions represent an example of a special purpose computer. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The present invention maybe embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A processing apparatus which simultaneously processes a plurality of transport streams that include data packets, the processing apparatus comprising:
   a transport processor memory; and
   a plurality of transport processor units that commonly utilize the transport processor memory, wherein the transport processor memory includes a plurality of demultiplexing contexts for maintaining information for data packets acquired by the transport processor units, and wherein each of the transport processor units comprises:
      a transport interface that identifies the data packets to acquire from an incoming transport stream;
      a demultiplexing processor that performs processing operations on the acquired data packets; and
      a demultiplexing direct memory access (DMA) unit that determines where the acquired data packets are to be transported.

2. A processing apparatus as recited in claim 1, wherein the transport interface generates a time stamp in header information of the acquired data packets to allow for clock recovery.

3. A processing apparatus as recited in claim 1, wherein the demultiplexing processor performs filtering operations on the acquired data packets.

4. A processing apparatus as recited in claim 3, further comprising a DMA switch which arbitrates transport of DMA packet information from among the demultiplexing DMA units of the plurality of transport processor units.

5. A processing apparatus as recited in claim 4, wherein the demultiplexing DMA unit has a DMA random access memory for buffering packet information for transfer through the DMA switch.

6. A processing apparatus as recited in claim 4, further comprising a playback DMA, wherein the DMA switch further comprises a playback DMA interface for sending DMA information to the playback DMA.

7. A processing apparatus as recited in claim 6, wherein the playback DMA can selectively send information back to one of the transport processor units and a component external to the processing apparatus.

8. A processing apparatus for simultaneously processing a plurality of transport streams that include data packets, the processing apparatus comprising:
 a shared context storage; and
 a plurality of transport processor units that commonly utilize the shared context storage, wherein the shared context storage includes a plurality of demultiplexing contexts for maintaining information for data packets acquired by the transport processor units, and wherein each of the plurality of transport processor units comprises:
  a transport interface that identifies the data packets to acquire from an incoming transport stream;
  a demultiplexing processor that performs processing operations on the acquired data packets; and
  a demultiplexing direct memory access (DMA) unit that determines where the acquired data packets are to be transported.

9. A processing apparatus as recited in claim 8, further comprising a shared filter storage shared among the plurality of transport processor units, wherein the demultiplexing contexts point to the location of filters in the shared filter storage.

10. A processing apparatus as recited in claim 8, wherein the shared context storage has a plurality of DMA contexts for storing an address and a length of DMA buffers in which the information for the data packets is stored.

11. A processing apparatus which simultaneously processes a plurality of transport streams that include data packets, the processing apparatus comprising:
 means for storing information; and
 a plurality of means for processing incoming transport streams, wherein the plurality of means for processing commonly utilize the means for storing information, wherein the means for storing information includes a plurality of demultiplexing contexts for maintaining information for data packets acquired by the transport processor units, and wherein each of the plurality of means for processing comprises:
  means for identifying the data packets to acquire from an incoming transport stream;
  means for performing processing operations on the acquired data packets; and
  means for determining where the acquired data packets are to be transported.

12. A processing apparatus as recited in claim 11, wherein the plurality of means for processing comprise at least four transport processor units.

13. A processing apparatus as recited in claim 11, wherein:
 each of the plurality of means for processing processes one of the incoming transport streams;
 the incoming transport streams processed by the plurality of means for processing comprise different copies of the same incoming transport stream; and
 each means for processing performs a different demultiplexing operation on the copy of the incoming transport stream that corresponds thereto.

14. A processing apparatus as recited in claim 11, wherein one or more of the incoming transport streams comprise input from a playback DMA associated with the processing apparatus.

15. A processing apparatus as recited in claim 11, wherein one or more of the incoming transport streams comprise input from an external system source not originating from the processing apparatus.

16. A processing apparatus as recited in claim 11, wherein one or more of the incoming transport streams comprise input from a source external to a system that includes the processing apparatus.

17. A processing apparatus as recited in claim 11, wherein the number of incoming transport streams exceeds the number of means for processing and wherein the processing apparatus further comprises means for selecting one of the transport streams to be processed by each of the means for processing.

18. In a video processing device configured to receive a plurality of incoming transport streams, the video processing device having a shared context storage and a plurality of transport processor units, a method for processing data packets comprising the acts of:
 receiving data packets each having a packet identifier;
 filtering the data packets by comparing the packet identifier of each of the received data packets with a data structure that specifies the packet identifiers of data packets that are to be acquired;
 processing the filtered data packets using information included in one of a plurality of demultiplexing contexts stored in the shared context storage, the demultiplexing contexts maintaining status information of data packets processed by the video processing device; and
 sending video data included in the data packets to buffers identified using information included in one of a plurality of direct memory access (DMA) contexts stored in the shared context storage, the DMA contexts maintaining the buffer information for data packets processed by the video processing device.

19. A method as recited in claim 18, wherein the buffers comprise ping pong buffers.

20. A method as recited in claim 18, wherein the buffers comprise ring buffers.

21. A method as recited in claim 18, wherein the information contained in each DMA context includes an address and a length of the buffer to which the video data is to be sent.

22. A method as recited in claim 21, wherein the information contained in each of the DMA contexts further includes information relating to special processing of packets, wherein the information relating to special processing is included in control fields of the DMA contexts, and wherein the information relating to special processing includes at least one of interrupt information, new buffer information, and buffer repeat information.

23. A method as recited in claim 18, wherein the method comprises performing the acts of receiving, filtering, processing and sending the data packets by each of the plurality of transport processor units substantially simultaneously such that the video processing device processes the plurality of transport streams substantially simultaneously.

24. In a video processing device configured to receive a plurality of incoming transport streams that include data packets, the video processing device having a plurality of transport processor units that utilize a common transport memory to maintain information associated with data packets processed by the video processing device, a method for processing a data packet using an index associated with the data packet, the method comprising the acts oft:
    receiving a data packet at a transport interface of one of the transport processor units;
    generating an index associated with the received data packet;
    accessing first information from the common transport memory using the index, wherein the first information enables a demultiplexing processor of said one of the transport processor units to perform a processing operation on the data packet; and
    accessing second information from the common transport memory using the index, wherein the second information enables a demultiplexing direct memory access (DMA) unit of said one of the transport processors to identify a buffer in which video data included in the data packet is to be stored.

25. A method as recited in claim 24, further comprising the act of selectively descrambling the video data included in the data packet using the first information accessed from the common transport memory.

26. A method as recited in claim 24, further comprising the act of filtering video information included the data packet using a filter from a shared filter storage, the filter being located using the first information accessed from the common transport memory.

27. A method as recited in claim 24, further comprising the act of storing the video data included in the data packet in one of a plurality of storage formats, the storage format being identified using the first information accessed from the common transport memory.

28. In a video processing device configured to receive a plurality of incoming transport streams that include data packets, the video processing device having a plurality of transport processor units that utilize shared context storage having demultiplexing contexts for maintaining information associated with the data packets processed by the video processing device and direct memory access (DMA) contexts for maintaining buffer information for the data packets processed by the video processing device, a method for processing a data packet using an index associated with the data packet, the method comprising the acts of:
    receiving a data packet at a transport interface of one of the transport processor units;
    generating an index associated with the received data packet;
    accessing, by a demultiplexing processor of one of the plurality of transport processor units, a demultiplexing context associated with the data packet from the shared context storage using the index;
    generating a DMA index associated with the data packet using the demultiplexing context; and
    accessing, by a demultiplexing DMA unit of said one of the plurality of transport processor units, a DMA context associated with the data packet from the shared context storage using the DMA index such that the demultiplexing DMA unit is enabled to identify a buffer in which video data included in the data packet is to be stored.

29. A method as recited in claim 28, wherein the act of accessing a demultiplexing context comprises:
    identifying a location of the demultiplexing context in the shared context storage; and
    reading information in the demultiplexing context into the demultiplexing processor.

30. A method as recited in claim 28, wherein the act of generating a DMA index comprises the act of selecting a DMA channel on which to write the video data, the DMA channel being associated with the DMA context, the DMA index pointing to the DMA context.

31. A method as recited in claim 28, wherein the act of accessing the DMA context comprises:
    identifying a location of the DMA context in the shared context storage, the DMA context being associated with the DMA index; and
    reading information in the DMA context into the demultiplexing DMA unit.

32. A method as recited in claim 28, further comprising:
    modifying the demultiplexing context and writing the modified demultiplexing context to the shared context storage; and
    modifying the DMA context and writing the modified DMA context to the shared context storage.

33. In a video processing device configured to receive an incoming transport stream that includes data packets, the video processing device having a unit that utilizes a transport memory to maintain information associated with data packets acquired by the video processing device, a method for delaying processing of data packets associated with a video program using an index associated with the data packets, the method comprising the acts of:
    repeatedly performing the acts of:
        receiving a data packet at a transport interface of a transport processor unit;
        generating a time stamp associated with the received data packet;
        generating an index associated with the received data packet;
        accessing information from the transport memory using the index, wherein the index includes a plurality of demultiplexing contexts for maintaining the information for the data packets, which are acquired by a plurality of transport processor units, and wherein the information enables a demultiplexing direct memory access unit of the transport processor to identify a buffer in which the data packet is to be stored;
    accessing data packets associated with the video program from the buffers in which the data packets are stored; and
    processing the data packets for recording or playback of the video program.

34. A method as recited in claim 33, wherein the act of accessing data packets associated with the video program from the buffers in which the data packets are stored comprises reconfiguring a transport stream containing the video program utilizing the time stamps associated with the received data packet, wherein the transport stream is received by the video processing device for processing.

* * * * *